Jan. 18, 1949.  A. J. STAMM  2,459,550
DESTRUCTIVE DISTILLATION OF
SOLIDS IN A LIQUID BATH
Filed Jan. 10, 1947

INVENTOR.
A. J. STAMM
BY
H. N. Foss
L. M. Masters
ATTORNEY

Patented Jan. 18, 1949

2,459,550

UNITED STATES PATENT OFFICE 2,459,550

DESTRUCTIVE DISTILLATION OF SOLIDS IN A LIQUID BATH

Alfred J. Stamm, Madison, Wis.; dedicated to the free use of the People in the territory of the United States Application January 10, 1947, Serial No. 721,336

7 Claims. (Cl. 202—18)

(Granted under the act of March 3, 1883, as amended April 30, 1928; 370 O. G. 757)

This application is made under the act of March 3, 1883, as amended by the act of April 30, 1928. and the invention herein described, if patented, may be manufactured and used by or for the Government of the United States of America for governmental purposes without the payment to me of any royalty thereon.

I hereby dedicate the invention herein described to the free use of the People in the territory of the United States to take effect on the granting of a patent to me.

This invention relates to the destructive distillation of solid organic materials, such as wood and coal.

An object of the invention is the provision of a rapid and continous method for the destructive distillation of wood and other solid organic materials, and an apparatus therefor.

By means of this invention, the rate of transfer of heat to the organic material is increased so as to thermally decompose the material in the minimum possible time, thus reducing the time for making coke or charcoal from days or hours to a few minutes.

By means of my process distillation temperature can be accurately controlled throughout the material being distilled either above or below the temperature at which heat is spontaneously evolved from the organic material, thus assuring the production of a uniform distillation residue with any desired degree of char and volatile content.

Another advantage lies in the fact that air is excluded from the distillation system more effectively than can be accomplished by circulation of steam or inert gases.

The invention also has the advantage that the distillate is condensed in a matter of seconds after it is formed, thus avoiding cracking and polymerization which occur when the vapors are subjected to elevated temperatures for long periods of time as in the processes known heretofore.

The foregoing objects and advantages are obtained when wood in the form of sawdust, shavings, or chips, or other solid organic material in subdivided form, is continuously fed between fine metal screens in layers from about ⅛ to ½ inch thick and then passed rapidly through a heated molten metal bath with both screens completely immersed in the molten metal.

The accompanying drawings illustrate apparatus which may be used to carry out the process.

Figure 1:
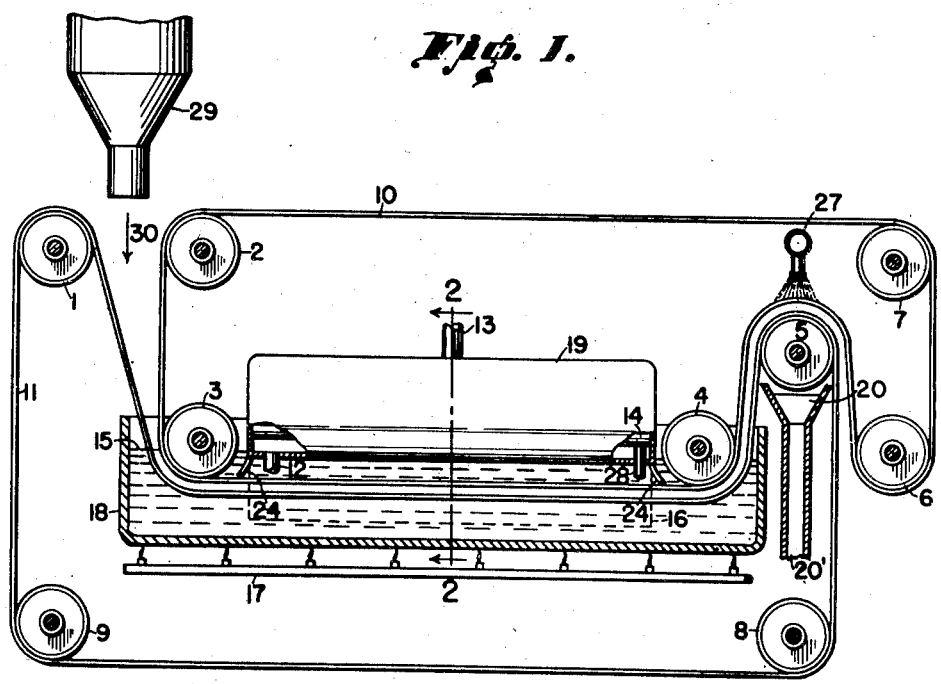
Figure 1 represents a side view of the apparatus, the side of the tank being cut away.

Molten metal baths have previously been used as the heating media in the destructive distillation of coal. The coal, however, was floated on the surface of the metal and moved along with a scraping device. The process was not a success, due to the fact that the coke emerging from the distillation chamber became contaminated with adhering metal and caught fire spontaneously. It has been found that when the material to be distilled is contained between two fine mesh screens, the tendencies for contamination and spontaneous combustion are removed. When screens of about 80 mesh or finer are used, the tendency for the molten metal to pass through is negligible, while distillation vapors can readily escape through the screens. When the screens with their contained distillation residue come out from the distillation chamber into the air, the tendency for air to circulate through the screens is negligible. The hot charcoal is not subject to spontaneous combustion as long as it remains between the screens. It can thus be readily cooled to the extent necessary to avoid spontaneous combustion before being discharged from between the screens by passing the screens over cooled rolls or spraying the screens with water.

It has been discovered that when the screens pass beneath the surface of the molten metal, better heat transfer and better heat control are obtained than when heating occurs only from the surface of the metal. This immersion procedure further furnishes an ideal way to continuously introduce the material to be distilled into the distillation chamber and to remove it from the distillation chamber without introducing oxygen other than that within the capillary structure of the wood or other solid organic material.

It is desirable to pass the screens just slightly beneath the surface of the molten metal from one end of the bath to the other, thus allowing the vapors resulting from the distillation to rapidly escape through the upper screen and through the overlaying molten metal and be condensed directly above the surface of the molten metal. This affords a much more rapid means of removing the vapors from the distillation zone than has been obtained by any other destructive distillation method for solids.

It has been found that stainless steel and ordinary steel screens with about 80 meshes per linear inch up to 200 meshes per linear inch are suitable for my process. It is believed, however, that screens of stainless steel are more suitable than ordinary steel because of their greater resistance to corrosive vapors.

Any nonreadily oxidizable metal that melts at a temperature somewhat below the desired operating temperature of the bath would be suitable for the heating medium. A bath consisting of 50 percent tin, 30 percent lead, and 20 percent cadmium which melts at about 150° C. has been successfully used. Woods metal and related alloys are also advantageous. These metals do not penetrate the 80-mesh screens under any of the operating temperatures or conditions used.

The tendency for the screen to become fouled by oxidized metal at the entrance and exit zones of the bath where reducing conditions are not prevalent can be avoided by applying a thin layer of graphite on the surface of the molten metal at the entrance and exit zones through which the screens pass.

One form of equipment in which these various teachings can be accomplished is illustrated in side view in Figure 1. A condensing canopy which encloses the distillation chamber and contains a suitable form of large surface condenser near the surface of the molten metal is shown in end view in Figure 2.

In Figure 1, elements 10 and 11 are two continuous screens between which the solid material to be distilled is disposed. Screen 10 operates on rolls 2, 3, 4, 5, 6, and 7. Screen 11 operates on rolls 1, 3, 4, 5, 8, and 9. Rolls 1 and 6 are adjustable, to apply tension to the screens and their alignment. Sealing flanges 25 and 26, which support the screens, are attached to the walls 16 and may also extend upwardly at the inlet and outlet ends, being attached to the walls of tank 18 at said ends. The sealing flanges are, however, not necessary.

Roll 5 may be water-jacketed. It dips into a pan 20 containing circulating cold water and having an outlet 20'. Roll 5 may be provided with an overhead water spray 27 under which conditions 20' serves as a drain. 18 is the tank containing the molten metal. 15 is the molten metal level in the tank. 17 is a gas burner used for heating the tank. The tank, however, may be heated internally by electrical means or may be tube fired. 12 and 13 are cooling water inlets and outlets, respectively. Pipes 14 and 14' are condensate drains.

Figure 2:
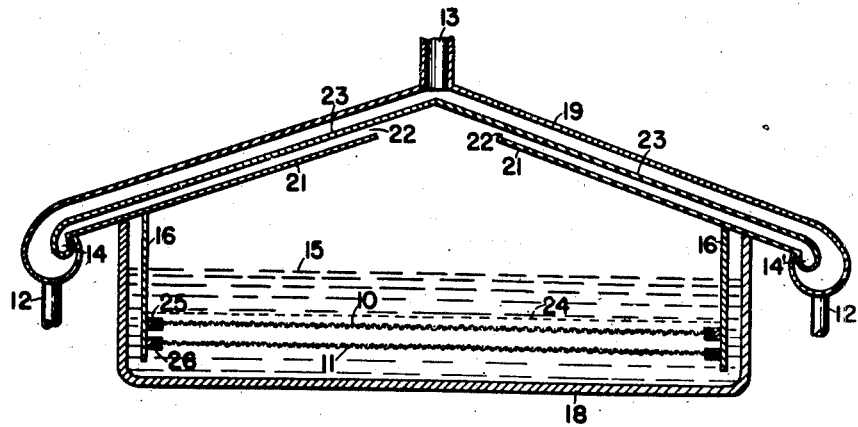
Figure 2 is a section at line 2—2 of Figure 1, viewed in the direction of the arrows.

The tank and condenser are shown in detail in Figure 2. Walls 19 and 23 form the water-jacket. 21 is the condenser baffle plate to catch the condensate and direct it into the end drains 14. Walls 16 and 24 form the sides of the canopy which extend beneath the level, 15, of the molten metal in tank 18 and thus prevent side escape of vapors. They are sealed to the baffle plate 21. The baffle plate 21 merely rests on the sides of tank 18 so that the canopy can be readily removed. The extension of the water-jacket 23 and the baffle plate 21 beyond the sides of the tank 18 should be increased from one end of the tank 18 to the other to give drains 14 and 14' a pitch, for draining the condensate. Numerals 22, 22 represent the spaces between the walls of the water-jackets 23, 23 and baffles 21, 21. The vapors arising from the tank enter these spaces and are cooled by contact with the walls of the water-jackets 23, 23. Condensate so formed runs downwardly into drains 14 and 14' and may be withdrawn from the system by a pipe 28 connected at the lowest point of drain 14. If desired, outlets for uncondensed vapors may be provided, for example, at points above 14 and 14'.

In carrying out the process the following procedure is employed:

The tank 18 is filled to the level 15 with a suitable metal such as the alloy containing 50 percent tin, 30 percent lead, and 20 percent cadmium. The metal is then heated to the temperature desired by the gas burner 17 or other equivalent means. The screens are then started moving through the bath of molten metal in the proper direction (left to right in Fig. 1) by rotating the rolls 1 to 9 by any suitable means. Obviously, all the rolls need not be actuated by such means but at least one of the rolls must be driven. The solid organic material, sawdust for instance, is then fed between the screens at the point 30, from hopper 29, where the screens converge near roll 3. Water or other cooling fluid is passed through the jacket 19—23 through pipe 12 and the effluent water removed through pipe 13. Roll 5 is cooled by spraying with water or other means mentioned heretofore. The sawdust is carried by the screens beneath the surface of the hot molten metal whereby it is destructively distilled. As the screens emerge from the bath of molten metal at a point adjacent to roll 4, the screens and the contents between them are cooled by roll 5. The charred material is discharged after the screens pass roll 5, and may be collected in a hopper (not illustrated). The distillate produced in the reaction passes through the upper screen 10, rises through the bath of molten metal and enters the spaces 22 where it is cooled by contact with walls of jacket 23. The condensed material flows down the inside of baffles 21 and collects in drains 14 from whence it is removed by pipes 28 attached to the lowest points of drain 14. The temperature of the bath and the speed of the screens through the bath are adjusted so that the sawdust is properly distilled in one pass to yield a product with the desired degree of char and volatile content.

This form of continuous distillation equipment is suitable for the distillation of any form of solid organic material in subdivided form, such as wood sawdust, chips, or shavings, coal in powder or pea size, and various forms of subdivided plant residue.

The optimum operating temperature and time depend upon the thickness of the organic material between the screens, the degree of compactness of the organic material, and the degree of destructive distillation desired. It is possible, with this equipment, to stop the destructive distillation reaction at any stage of partial char or obtain a practically pure char with a negligible volatile content. When sawdust is used as the material to be destructively distilled in a layer about ¼ inch thick between the screens, various degrees of char can be obtained in 1 to 10 minutes at 300° to 360° C. temperature. The successful operation of the equipment, however, is not limited to these conditions. They are given as examples and not as limiting factors in the process.

Having thus described my invention, I claim:

1. A process for destructive distillation of subdivided, solid, organic material comprising; maintaining a bath of molten material; disposing and confining the organic material between upper and lower barrier surfaces; submerging the barrier surfaces and the confined material beneath the surface of the molten material; the barrier surfaces being substantially impermeable to flow of the molten material to prevent admixture of the molten material with the confined material; the upper barrier surface being permeable to the flow of vapor; distilling the confined material by heat from the molten material; removing the vapors through the upper barrier surface and the overlying molten liquid; withdrawing the barrier surfaces, with the confined distilled organic material residue therebetween, from the molten material bath; and cooling the said withdrawn barrier surfaces with the said residue therebetween.

2. A process for destructive distillation of subdivided, solid, organic material comprising; maintaining a bath of molten metal; confining the organic material between upper and lower barrier surfaces; submerging the barrier surfaces and the confined material beneath the surface of the molten metal; the barrier surfaces being substantially impermeable to flow of the molten metal to prevent admixture of the molten metal with the confined material; the upper barrier surface being permeable to the flow of vapor; distilling the confined material by heat from the molten metal; removing the vapors through the upper barrier surface and the overlying molten liquid; withdrawing the barrier surface, with the confined distilled organic material residue therebetween, from the molten metal bath.

3. The process of claim 2 in which the barrier surfaces are coated with graphite before being submerged in the bath and upon withdrawal from the bath.

4. A process for destructive distillation of subdivided, organic material comprising; maintaining a body of molten material; confining the said organic material between upper and lower barrier surfaces that are impermeable to the molten material; submerging and moving the upper and lower barrier surfaces and the confined material in and through the molten bath; distilling the organic material by heat from the molten material; and removing the vapors through the upper barrier surface, the latter being vapor-permeable.

5. The process of claim 1 in which the solid organic material is subdivided wood.

6. The process of claim 1 in which the organic material is finely divided coal.

7. An apparatus for the rapid continuous destructive distillation of subdivided solid organic material comprising; a chamber containing a molten metal bath; means mounted partly within the chamber for conveying the organic material to, through, and from the bath, comprising an upper and a lower endless conveyor screen no coarser than about 80 mesh, adapted to confine and convey the organic material therebetween; the screens being mounted for movement in the same direction longitudinally of and beneath the surface of the molten metal and for withdrawal together from the bath; both screens being substantially impermeable to flow of the molten metal to prevent admixture of the molten material with the organic material confined therebetween, the upper conveyor being permeable to flow of vapor; and condenser means mounted adjacent to the surface of the molten metal to condense the vapors distilled from the organic material.

ALFRED J. STAMM.

REFERENCES CITED

The following references are of record in the file of this patent:

UNITED STATES PATENTS

| Number | Name | Date |
|---|---|---|
| 294,510 | Sargent | Mar. 4, 1884 |
| 1,172,682 | Doherty | Feb. 22, 1916 |
| 1,520,080 | Prichard et al. | Dec. 23, 1924 |
| 1,601,777 | Spotz | Oct. 5, 1926 |
| 1,658,143 | Tripp | Feb. 7, 1928 |
| 1,681,808 | Morgan | Aug. 21, 1928 |
| 1,709,370 | Piron et al. | Apr. 16, 1929 |
| 1,709,371 | Piron | Apr. 16, 1929 |

FOREIGN PATENTS

| Number | Country | Date |
|---|---|---|
| 488,878 | Great Britain | July 15, 1938 |